Oct. 14, 1958
P. P. GARATONI
2,856,568
PROPORTIONAL CONTROL SYSTEM
Filed Feb. 20, 1956
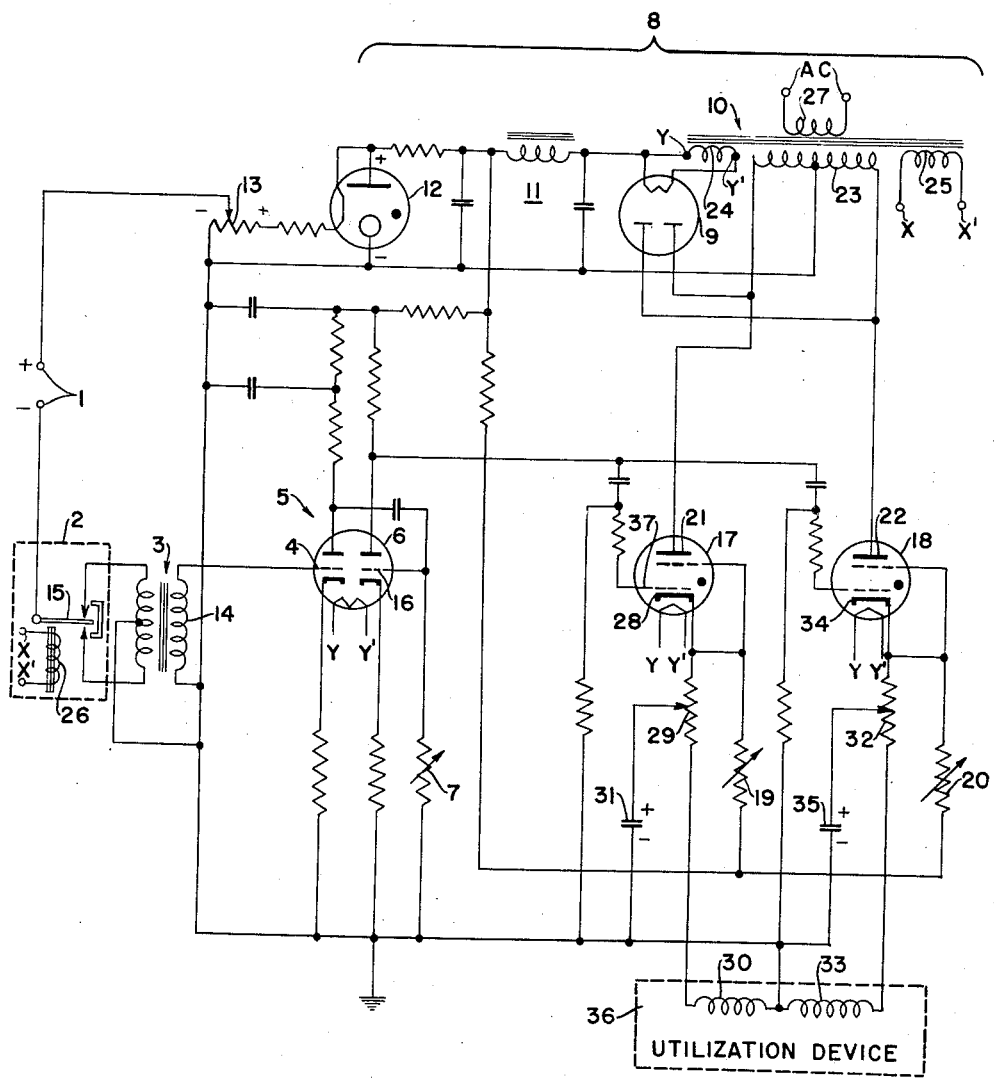
INVENTOR
PAUL P. GARATONI
BY
Pennie, Edmonds, Morton, Barrows & Taylor
ATTORNEYS

United States Patent Office 2,856,568
Patented Oct. 14, 1958

2,856,568

PROPORTIONAL CONTROL SYSTEM

Paul P. Garatoni, Derby, Conn., assignor to The American Brass Company, a corporation of Connecticut Application February 20, 1956, Serial No. 566,573

5 Claims. (Cl. 317—123)

This invention relates to control systems in which the operation of a utilization device is controlled in response to an error signal. More particularly the invention relates to such systems in which the rate, as well as the degree, of correction of the error is substantially proportional to the error.

Control systems by which the maintenance of predetermined operation of a utilization device is automatic are by their nature servo-systems, because the error, viz., the departure from normal or desired operation, generates a signal which, in turn, actuates the control system in respect to magnitude and sense. Heretofore such control systems have been complicated, expensive and frequently unreliable in performance, especially if sufficiently sensitive to control the operation of the utilization device within close limits of error and without over-correction. On the other hand, the control system of this invention involves comparatively few circunit elements and these in themselves are of a reliable nature. As a result the system is inexpensive, rugged in service, and is adapted to control a wide variety of equipment and devices, whether large and powerful, or small and delicate.

The system of the present invention when employed as an automatic control can be considered as a closed loop servo-system, the output or load function being maintained within close tolerance of an arbitrarily set standard. Deviations in either direction from the standard are detected by a device which produces in the system a voltage of magnitude commensurate with that of the deviation and of phase representative of the direction, viz., of the deviation, both being measured with respect to an adjustable reference voltage.

The nature of the invention and its many advantages will be apparent from the following description considered in connection with the accompanying drawing which is a circuit diagram of a preferred embodiment of the invention.

In the example herein illustrated, the utilization device comprises the rolls in a metal rolling mill. In such mills the pressure applied to the rolls determines the thickness of the sheet being rolled. Because of irregularities in the thickness of the metal as it is fed to the rolls and also because of variations in hardness of the metal, the roll pressure must be varied in order to maintain uniform thickness. The pressure is applied to the rolls by electric motors, known as screwdown motors, which move the upper roll with respect to the lower roll of the pair. Separate motors, or a single reversible motor, can be employed to move the roll down and up, respectively. Formerly, screwdown motors were manually controlled, but more recently automatic control has been recognized as preferable.

The thickness of the metal on the output side of the rolls is calibrated or measured by a suitable thickness gauge, the electrical output of which is here referred to as the error signal. There are a variety of thickness gauges known in the art, and some of them provide an output voltage, as here preferred, which is commensurate with the gauged thickness. One example of thickness gauge providing a D. C. error signal is described in U. S. Patent No. 2,660,077, granted November 24, 1953. This output voltage comprises the error signal which is applied to input terminals 1. Alternatively, the error signal may be dervied from a manually adjustable device such as a potentiometer. In that case the control system of this invention would be the same, but it would not be in a closed servo-loop. In other words, the source of the error signal is immaterial to this invention. In the present case the error signal is assumed to be a D. C. voltage which fluctuates in proportion to the degree of error, viz., the deviation from normal or from the desired condition of the utilization device. With slight modification of the circuit herein described an A. C. signal could be used.

The uni-directional error signal derived as above described is interrupted at a fixed rate by voltage inverter means such as a vibrator or chopper 2, the output of which is coupled through secondary 14 of transformer 3 to the control grid 4 of a two-stage, resistance-coupled vaccum tube amplifier 5. The tube 6 of this amplifier is conveniently of the 6SL7 type which is a duplex triode. The amplifier gain is controlled by the adjustable bias resistor 7 which controls the bias on grid 16.

The anodes of amplifier tube 6 are furnished with correct anode voltage from the voltage supply 8 which, as shown, comprises the usual full-wave rectifier 9 operating from a suitable power transformer 10. The output of power rectifier 9 is smoothed by filter 11, and the unidirectional output voltage is maintained constant by voltage regulator 12. The output of voltage regulator 12 includes potentiometer 13 of which the slider is connected to the positive signal input terminal 1. Since the negative signal input terminal is connected to the vibrating element 15 of chopper 2, this circuit constitutes means for combining, in opposition, the signal voltage with the adjustable reference voltage which is developed across the potentiometer 13. If the error signal is alternating instead of uni-directional, as above suggested, the chopper 2 should be omitted and the reference voltage derived preferably from the same alternating power source and combined with the signal voltage 180° out of phase.

Coupled in parallel to the output of amplifier 5 are two grid-controlled gas-filled rectifier tubes 17 and 18 for which Thyratron type 2050 is suitable. As is well known, these tubes function fundamentally as relays and conduct or "fire" only when positive potentials of suitable values are impressed on their anodes and control grids simultaneously. The types shown are tetrodes, and the control-grid potential at which the tubes will fire can be adjusted by adjustment of the suppressor grid resistors 19 and 20, respectively. Rheostats having a maximum value of approximately 1 megohm will provide a convenient range of adjustment for tubes of this type. The anodes 21 and 22 of Thyratrons 17 and 18, respectively, are energized by alternating current 180° out of phase by the connections, respectively, to the opposite ends of secondary winding 23 of power transformer 10. The same secondary winding also furnishes the necessary A. C. voltage to rectifier tube 9, previously mentioned. Secondary winding 24 furnishes cathode heater current for vacuum tubes 6, 9 and Thyratrons 17, 18. Secondary winding 25 furnishes energizing current to actuating coil 26 of chopper 2, it being understood that terminals X are connected together and terminals X' are connected together. Thus the chopper is synchronized with the anode voltage applied to the Thyratrons because both operating voltages are derived from the same alternating-current power source. It is assumed that a suitable source of alternating current such as 120 volts, 60 cycles, is applied to the primary winding 27 of power transformer 10.

The cathode circuits of the Thyratron tubes 17 and 18 comprise an important feature of the present invention because they constitute timing circuits which include impedance elements which, in turn, are control elements for controlling the operation of the utilization device. As shown in the circuit diagram, each of these timing circuits comprises a variable resistor connected in series with an inductance between the cathode and common ground, the inductance and a variable portion of the resistor being shunted by a condenser. Thus, referring to tube 17, potentiometer 29 and inductance 30 are connected in series between cathode 28 and ground, the slider of potentiometer 29 being connected to ground through condenser 31. This condenser therefore shunts coil 30 and the portion of potentiometer 29 between the slider and the lower end of the potentiometer which is connected to coil 30. Similarly, in respect to tube 18, potentiometer 32 is connected in series with inductance 33 between cathode 34 and ground. As before, condenser 35 shunts inductance 33 and a variable portion of potentiometer 32. The corresponding circuit elements associated with tubes 17 and 18 should be respectively of similar values and characteristics. In the embodiment herein illustrated, potentiometers 29 and 32 were of 10,000 ohms each, inductances 30 and 33 were of approximately 4,000 ohms resistance each, and condensers 31 and 35 were of approximately 2 microfarads each.

Inductance coils 30 and 33 are generally represented as being suitably coupled to or forming part of a utilization device 36 or of control elements associated therewith. This general representation is intentional because the specific nature of the utilization device is immaterial to the invention. As above mentioned, the utilization device for which the circuit of this invention was originally designed comprised rolls in a metal-rolling mill. In that instance, coils 30, 33 were the actuating coils of a reversing motor starter. It will be evident to persons familiar with motor control equipment that these coils may also represent solenoids of motor control relays, motor starting coils or motor field windings. In controlling rolling mill rolls it has been found desirable to have adjusting means (potentiometers 29, 32) for independently adjusting the correction rates in each direction, and adjusting means (rheostats 19, 20) for independently adjusting the operating limits. However, for some applications these adjusting elements may, if properly proportioned, be arranged for uni-control. In this case the moving members of potentiometers 29 and 32 would be on one shaft and those of rheostats 19 and 20 on another shaft.

The operation of the control system of the invention as illustrated in the drawing may be described as follows: The control signal impressed on the grid 4 of amplifier tube 6 will vary in magnitude in accordance with the magnitude of the D. C. error signal connected to terminals 1. Furthermore, the phase of this control signal will shift by 180 degrees when the error signal goes above or below an arbitrary standard reference voltage which is predetermined by adjustment of potentiometer 13. When the error signal is above, for example, we may assume that the control signal impressed on grid 37 of tube 17, as well as the anode potential, is positive so that the tube will fire. The same signal pulses are simultaneously impressed on the control grid of Thyratron 18. However, since the anode 22 of tube 18 is simultaneously negative this tube will not fire. Under these conditions it will not fire in the other phase either, because its grid will then be negative. Assuming in this case that the mentioned signal pulse fires tube 17, a unidirectional current will flow through resistor 29 and inductance coil 30, charging shunt condenser 31. Since the initial charge is the same on each pulse, the condenser voltage is constant until it begins to discharge through the circuit elements which it shunts. This discharge circuit is in effect a constant-current circuit and the average current through it operates the motor control (or other device) of which coil 30 is a part. The current magnitude, therefore, is an inverse function of time of discharge of the condenser 31.

The charge on condenser 31 impresses a negative bias on the control grid 37 of tube 17, thus reducing to that extent the positive potential impressed on that grid due to the control signal. Hence, the firing rate of the tube and the magnitude of the current in control coil 30 are functions both of the magnitude of the control potential impressed on grid 37 and of the negative bias potential derived from condenser 31 which in turn is dependent upon the adjustment of potentiometer 29 which varies the time constant of the discharge circuit. From this it will be seen that for a small error signal the voltage across the cathode condenser 31 must decay for a longer period of time as compared with the decay period for a large error signal, before conduction or firing can reoccur, for any given setting of potentiometer 29.

The operation of Thyratron 18 corresponds exactly to the operation of Thyratron 17 just described except that it fires on alternate cycles because its anode 22 is energized by a voltage which is 180° out of phase with the voltage which energizes the anode 21 of tube 17. Since the control signal pulses are in synchronism with the alternating potential impressed on the anodes of the two Thyratrons, and since the phase of the control signal differs by 180° depending upon whether the error signal voltage is more or less than the reference voltage, current will flow in coil 30, for example, if the error signal voltage exceeds the reference voltage and current will flow in coil 33, for example, if the error signal voltage is less than the reference voltage. Thus, the sense of the error in respect to the preselected standard determines whether current flows in one or the other of coils 30 and 33, and the magnitude of the error signal of either sense determines the magnitude of the controlling current flowing in coil 30 or 33. Obviously, if the signal voltage equals the reference voltage the system will be in balance and no controlling current will flow in either control coil 30 or 33.

The initial adjustment of the apparatus for most applications is as follows: With the utilization device operating at "normal," the "error" signal voltage should be set to have a value approximately at its midrange of possible fluctuation. The reference voltage is then adjusted to balance the error signal so that there is a minimum or no control signal on the grid 4 of tube 6. If correction is to commence at a given percentage deviation from normal (tolerance), the error signal is changed by this percentage, say 1%, in one direction and rheostat 19 adjusted until tube 17 just begins to fire, and then the error signal is changed by the same amount in the other direction and rheostat 20 adjusted until tube 18 begins to fire. Then the desired rate of correction in each direction is adjusted by means of potentiometers 29 and 32, respectively.

As a result of the mentioned proportionality of control, a large control signal representing a large error will produce maximum (continuous) correction control, whereas a smaller signal will cause the tube to fire less often, reducing the average current in the control element and producing a proportionally smaller degree of correction control. Since the output or controlling current variations are proportional to the signal variations in respect to time "on" (actuation) versus time "off" (deactuation), as well as to magnitude, either time or magnitude, or both, may be used as the function which controls the load or utilization device. If both are used, the control can be of second order effect, such as acceleration. Thus, not only can the control effect be proportional to the change in signal, but it can be proportional to the rate of change of signal.

From the foregoing it is apparent that the system of this invention is applicable to the control of substantially any device in respect to sense and degree, especially when it is desirable that the rate of control be proportional to the degree of deviation from the desired normal or standard. This prevents overcorrection or overshooting and also minimizes the time required to effect the correction.

I claim:

1. A control system adapted to control the operation of a utilization device in proportion to the degree and sense of variations in an error signal, which comprises means establishing a unidirectional reference voltage, a source of error signal voltage of variable magnitude commensurate with the error, voltage inverter means having input and output circuits, means for combining said reference and signal voltages in opposition in the input circuit of said inverter, means to form in the output circuit thereof an alternating control-signal voltage, a vacuum tube amplifier, means for adjusting the gain of said amplifier, means coupling the control signal voltage to a control electrode of said amplifier, a pair of gas-filled grid-controlled rectifier tubes having cathode circuits and anodes, means connecting the control grids of said rectifier tubes in parallel, means coupling the output voltage of said amplifier to the control grids of said rectifier tubes, a source of alternating voltage, means for connecting the respective anodes of said rectifier tubes in opposite phase to said source of alternating voltage, circuit means maintaining the frequency of said control-signal voltage in synchronism with the frequency of said alternating voltage, a grid bias circuit for each rectifier tube including resistance connected between the control grid of each said tube and ground, and means for adjusting the control grid voltage at which said rectifiers actuate, each of said cathode circuits comprising time-constant elements including a cathode resistor of the potentiometer type and a coil having inherent resistance connected in series between cathode and ground and a condenser connected between an adjustable tap on said cathode resistor and ground, whereby to adjust the relation between error signal voltage magnitude and deactuation periods of the rectifiers, said coils constituting respectively circuit elements for controlling the direction of operation of a utilization device in opposite senses.

2. A control system adapted to control the operation of a utilization device in proportion to the degree and sense of variations in an error signal, which comprises means establishing a unidirectional reference voltage, a source of unidirectional error signal voltage of variable magnitude commensurate with the error, means for adjusting the magnitude of said reference voltage, voltage inverter means having an input and an output, means for combining said reference and signal voltages in opposition in the input of said inverter means to form in the output thereof a pulsed control signal voltage, a vacuum tube amplifier, means coupling the control signal voltage to a control electrode of said amplifier, a pair of gas-filled grid-controlled rectifier tubes having cathode circuits and anodes, means connecting the control grids of said rectifier tubes in parallel, means coupling the output voltage of said amplifier to the control grids of said rectifier tubes, a source of alternating voltage, means for connecting the respective anodes of said rectifier tubes in opposite phase to said source of alternating voltage, circuit means maintaining the pulse rate of said control signal in synchronism with the frequency of said alternating voltage, a grid bias circuit for each rectifier tube including resistance connected between the control grid and a point of negative potential in the cathode circuit thereof, and means for adjusting the control grid voltage at which said rectifiers actuate, each of said cathode circuits comprising time-constant elements including an impedance connected in series with a variable resistance and a condenser shunting said impedance and a variable portion of said resistance whereby to adjust the relation between error signal voltage magnitude and deactuation periods of the rectifiers, said negative point comprising the negative side of said condenser and said impedances constituting respectively circuit elements for controlling the direction of operation of a utilization device in opposite senses.

3. A control system adapted to control the operation of a utilization device in accordance with the degree and sense of variations in an error signal, which comprises means establishing a reference voltage, a source of error signal voltage of variable magnitude commensurate with the error, a vacuum tube amplifier, means for combining said reference and signal voltages and means forming therefrom a control signal voltage of fixed pulse rate, means for applying the control signal voltage pulses to a control electrode of said amplifier, a pair of gas-filled grid-controlled rectifier tubes having cathode circuits and anodes, means connecting the control grids of said rectifier tubes in parallel, means coupling the output voltage of said amplifier to the control grids of said rectifier tubes, a grid bias circuit for each rectifier tube including resistance connected between the control grid and a point of negative potential in the cathode circuit thereof, a source of alternating voltage, means for connecting the respective anodes of said rectifier tubes in opposite phase to said source of alternating voltage, and circuit means maintaining the pulse rate of said control signal in sychronism with the frequency of said alternating voltage, each of said cathode circuits comprising time-constant elements including an impedance connected in series with a variable resistance and a condenser shunting said impedance and a variable portion of said resistance whereby to adjust the relation between error signal voltage magnitude and deactuation periods of the rectifiers, said negative point comprising the negative side of said condenser and said impedances constituting respectively elements for controlling the direction of operation of a utilization device in opposite senses.

4. A control system adapted to control the operation of a utilization device in accordance with the degree and sense of variations in an error signal, which comprises means establishing a reference voltage, a source of error signal voltage of variable magnitude, a vacuum tube amplifier, means for combining said reference and signal voltages, means forming therefrom a control signal voltage of fixed pulse rate, means for applying the control signal voltage pulses to a control electrode of said amplifier, a pair of gas-filled grid-controlled rectifier tubes having cathode circuits and anodes, means connecting the control grids of said rectifier tubes in parallel, means coupling the output voltage of said amplifier to the control grids of said rectifier tubes, a grid bias circuit for each rectifier tube including resistance connected between the control grid and a point of negative potential in the cathode circuit thereof, a source of alternating voltage, means for connecting the respective anodes of said rectifier tubes in opposite phase to said source of alternating voltage, and circuit means maintaining the pulse rate of said error signal in synchronism with the frequency of said alternating voltage, each of said cathode circuits comprising time-constant elements including an impedance shunted by a condenser, said negative point comprising the negative side of said condenser, and said impedances constituting respectively elements for controlling the direction of operation of a utilization device in opposite senses.

5. Means for controlling the operation of a utilization device in opposite senses and in response to an error signal, which comprises in combination a source of error signal voltage of variable magnitude commensurate with the error, means establishing a reference voltage, means converting said error signal to a control signal voltage of pulse characteristic and of variable magnitude related to said reference voltage as a standard, a pair of similar relay devices having input circuits and output circuits, means coupling said control signal voltage to said input circuits, an alternating voltage source connected to energize said relay devices so that said output circuits are energized in synchronism with said pulse rate and in opposite phase with respect to each other, a timing circuit for each relay device, said timing circuit including resistance and impedance connected in series in said circuit and capacitance connected in shunt to said impedance and to an adjustable portion of said resistance, means impressing on the input circuit of each relay device a control potential derived from the timing circuit thereof, and means connecting said impedances respectively to control the direction of operation of said utilization device in opposite senses.

References Cited in the file of this patent

UNITED STATES PATENTS

| | | |
|---|---|---|
| 1,969,536 | Winne | Aug. 7, 1934 |
| 2,275,509 | Dahlstrom | Mar. 10, 1942 |
| 2,506,006 | Wild | May 2, 1950 |
| 2,506,531 | Wild | May 2, 1950 |
| 2,692,963 | Hathaway | Oct. 26, 1954 |
| 2,781,479 | Rice | Feb. 12, 1957 |

UNITED STATES PATENT OFFICE
CERTIFICATE OF CORRECTION

Patent No. 2,856,568                                         October 14, 1958

Paul P. Garatoni

It is hereby certified that error appears in the printed specification of the above numbered patent requiring correction and that the said Letters Patent should read as corrected below.

Column 1, line 32, for "circunit" read -- circuit --; line 45, before "of the" insert -- sense, --.

Signed and sealed this 30th day of December 1958.

(SEAL)
Attest:

KARL H. AXLINE                                                 ROBERT C. WATSON
Attesting Officer                                               Commissioner of Patents